United States Patent
Volkerink et al.

(10) Patent No.: US 11,620,832 B2
(45) Date of Patent: Apr. 4, 2023

(54) IMAGE BASED LOCATIONING

(71) Applicants: Hendrik J. Volkerink, Palo Alto, CA (US); Ajay Khoche, West San Jose, CA (US)

(72) Inventors: Hendrik J. Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 16/911,287

(22) Filed: Jun. 24, 2020

(65) Prior Publication Data

US 2020/0401819 A1 Dec. 24, 2020

Related U.S. Application Data

(60) Provisional application No. 62/865,192, filed on Jun. 22, 2019.

(51) Int. Cl.
| | |
|---|---|
| *G06V 20/56* | (2022.01) |
| *G06T 7/593* | (2017.01) |
| *G06T 7/285* | (2017.01) |
| *G06T 7/73* | (2017.01) |
| *G06V 10/75* | (2022.01) |

(52) U.S. Cl.
CPC .............. *G06V 20/56* (2022.01); *G06T 7/285* (2017.01); *G06T 7/593* (2017.01); *G06T 7/73* (2017.01); *G06V 10/751* (2022.01); *G06T 2207/10021* (2013.01); *G06T 2207/10028* (2013.01); *G06T 2207/20021* (2013.01); *G06T 2207/30241* (2013.01); *G06T 2207/30244* (2013.01); *G06T 2207/30252* (2013.01)

(58) Field of Classification Search
CPC .. G06K 9/00791; G06K 9/6202; G06K 9/209; G06T 7/593; G06T 7/285; G06T 7/73; G06T 2207/10021; G06T 2207/30241; G06T 2207/30252; G06T 2207/10028; G06T 2207/20021; G06T 2207/30244; G06V 20/56; G06V 10/751; G06V 10/147
USPC ........................................................ 382/104
See application file for complete search history.

(56) References Cited

U.S. PATENT DOCUMENTS

| | | | |
|---|---|---|---|
| 9,325,899 B1 * | 4/2016 | Chou ................... H04N 5/2628 |
| 10,832,439 B1 * | 11/2020 | Ma .......................... G06V 20/58 |
| 11,067,995 B2 * | 7/2021 | Weiser ............... G06K 9/00791 |
| 2004/0221790 A1 | 11/2004 | Sinclair et al. | |

(Continued)

FOREIGN PATENT DOCUMENTS

WO WO-2018180579 A1 * 10/2018 ............... B60R 1/00

OTHER PUBLICATIONS

M. Agrawal and K. Konolige, "Real-time Localization in Outdoor Environments using Stereo Vision and Inexpensive GPS," 18th International Conference on Pattern Recognition (ICPR'06), 2006, pp. 1063-1068, doi: 10.1109/ICPR.2006.962. (Year: 2006).*

(Continued)

*Primary Examiner* — Ping Y Hsieh
*Assistant Examiner* — Daniella M. DiGuglielmo

(57) ABSTRACT

This disclosure relates to systems and methods of obtaining accurate motion and orientation estimates for a vehicle traveling at high speed based on images of a road surface. A purpose of these systems and methods is to provide a supplementary or alternative means of locating a vehicle on a map, particularly in cases where other locationing approaches (e.g., GPS) are unreliable or unavailable.

16 Claims, 5 Drawing Sheets

(56) References Cited

U.S. PATENT DOCUMENTS

| | | | | |
|---|---|---|---|---|
| 2009/0279741 | A1* | 11/2009 | Susca | G06T 7/246 |
| | | | | 382/107 |
| 2010/0034426 | A1* | 2/2010 | Takiguchi | G01C 21/3602 |
| | | | | 382/106 |
| 2013/0308820 | A1* | 11/2013 | Richards | G06T 7/285 |
| | | | | 382/103 |
| 2016/0014394 | A1* | 1/2016 | Suhr | G06T 5/10 |
| | | | | 348/43 |
| 2017/0045889 | A1* | 2/2017 | Yamaguchi | G06F 17/16 |
| 2017/0064287 | A1* | 3/2017 | Borisov | G06T 17/00 |
| 2018/0024562 | A1* | 1/2018 | Bellaiche | G06V 20/588 |
| | | | | 701/26 |
| 2018/0210465 | A1* | 7/2018 | Qu | B64D 47/08 |
| 2018/0211400 | A1* | 7/2018 | Park | G06V 30/413 |

OTHER PUBLICATIONS

Krombach, N., Droeschel, D., Houben, S., Behnke, S., "Feature-based visual odometry prior for real-time semi-dense stereo SLAM," Robotics and Autonomous Systems, 2018, pp. 38-58, doi.org/10.1016/j.robot.2018.08.002 (Year: 2018).*

Furgale, P., Extensions to the Visual Odometry Pipeline for the Exploration of Planetary Surfaces, 2011, pp. 1-156. (Year: 2011).*

Agrawal et al. "Real-time Localization in Outdoor Environments using Stereo Vision and Inexpensive GPS." In: 18th International Conference on Pattern Recognition (ICPR'06), Aug. 20-24, 2006. Retrieved from the Internet on Nov. 3, 2020.

Krombach et al. "Feature-based Visual Odometry Prior for Real-time Semi-dense Stereo SLAM." In: Robotics and autonomous Systems vol. 109, Nov. 2018. Retrieved from the Internet on Nov. 3, 2020.

Furgale. "Extensions to the Visual Odometry Pipeline for the Exploration of Planetary Surfaces." In: A thesis submitted in conformity with the requirements for the degree of Doctor of Philosophy Graduate Department of Aerospace Science and Engineering University of Toronto [Shortened: pp. i-ii, 13-53], 2011. Retrieved from the Internet on Nov. 3, 2020.

PCT International Search Report, International Application No. PCT/US 20/39362. International search completed Nov. 4, 2020. International Search Report dated Nov. 16, 2020. pp. 1-5.

* cited by examiner

IMAGE BASED LOCATIONING

This Application Claims Priority To U.S. Patent Application Ser. No. 62/865,192, Titled "Image Based Locationing", Filed Jun. 22, 2019.

BACKGROUND

Locationing systems can track mobile targets in real time. These systems typically ascertain information relating to their geographic locations based on communications with a variety of different wireless locationing systems (e.g., the Global Positioning System (GPS), cellular network systems (e.g., GSM), and wireless local area networks (e.g., a system of Wi-Fi access points). No single approach, however, provides continuous tracking information under all circumstances. For example, GPS tracking requires a tracking device to have an unobstructed view of at least four GPS satellites at the same time, making GPS tracking in urban and indoor environments problematic. Dead reckoning may be used to supplement GPS locationing when GPS signals are unavailable or inaccurate (e.g., as a result of signal multipath error). However, dead-reckoning navigation is limited by the rapid accumulation of errors and, requires a complex fusion process to integrate dead-reckoning navigation data with GPS navigation data. Map-matching techniques can improve locationing accuracy by identifying the most likely locations of a vehicle on a road network. However, the accuracy of map-matching techniques depends significantly on the accuracy of the position estimates for the mobile target being tracked and the fidelity of the spatial road map used to locate the mobile target in a geographic region.

In an embodiment, a method of processing a sequence of images to determine an image based trajectory of a vehicle along a road, comprising by a data processing system: rectifying each stereoscopic pair of images to a common epipolar plane; detecting features in each of the rectified stereoscopic pair of images in each successive frame, wherein the detected features are identified based on at least a comparison of colors or highlights within the rectified stereoscopic images; matching corresponding detected features in each rectified stereoscopic pair of images, wherein the matching comprises matching points of a detected feature in a first image of the rectified stereoscopic pair with corresponding detected features in a second image of the stereoscopic pair of images to produce a feature disparity map; calculating a depth at each location point to obtain a sparse three-dimensional depth map of the road; and determining motion and orientation of the vehicle between successive stereoscopic image frames based on execution of an optical flow process by the data processing system that determines estimates of motion and orientation between successive stereoscopic pairs of images.

In another embodiment, a method of processing a sequence of successive stereographic image frames to determine estimates of motion and orientation of a vehicle, the method comprising: dividing an image region above a road surface into multiple tracks; for each track, by the data processing system, estimating motion and orientation between corresponding features in respective stereographic image pairs, wherein the corresponding features are identified based on at least a comparison of colors or highlights within the rectified stereoscopic images; removing, by the data processing system, inconsistent motion and orientation estimates as outliers; determining, by the data processing system, estimates of motion and orientation based on an aggregation of consistent motion and orientation estimates; and processing the multiple tracks to obtain multiple independent estimates of a trajectory of the vehicle.

In an embodiment, a computer program product for execution by a computer system and comprising at least one non-transitory computer-readable medium having computer readable program code portions embodied therein to process a sequence of images to determine an image based trajectory of a vehicle along a road, the computer-readable program code portions comprising: an executable code portion to rectify each stereoscopic pair of images to a common epipolar plane; an executable code portion to detect features in each of the rectified stereoscopic pair of images in each successive frame, wherein the detected features are identified based on at least a comparison of colors or highlights within the rectified stereoscopic images; an executable code portion to match corresponding detected features in each rectified stereoscopic pair of images, wherein the matching comprises matching points of a detected feature in a first image of the rectified stereoscopic pair with corresponding detected features in a second image of the stereoscopic pair of images to produce a feature disparity map; an executable code portion to calculate a depth at each location point to obtain a sparse three-dimensional depth map of the road; and an executable code portion to determine motion and orientation of the vehicle between successive stereoscopic image frames based on execution of an optical flow process by the data processing system that determines estimates of motion and orientation between successive stereoscopic pairs of images.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

This disclosure relates to systems and methods of obtaining accurate motion and orientation estimates for a vehicle traveling at high speed based on images of a road surface. A purpose of these systems and methods is to provide a supplementary or alternative means of locating a vehicle on a map, particularly in cases where other locationing approaches (e.g., GPS) are unreliable or unavailable.

Figure 1A:
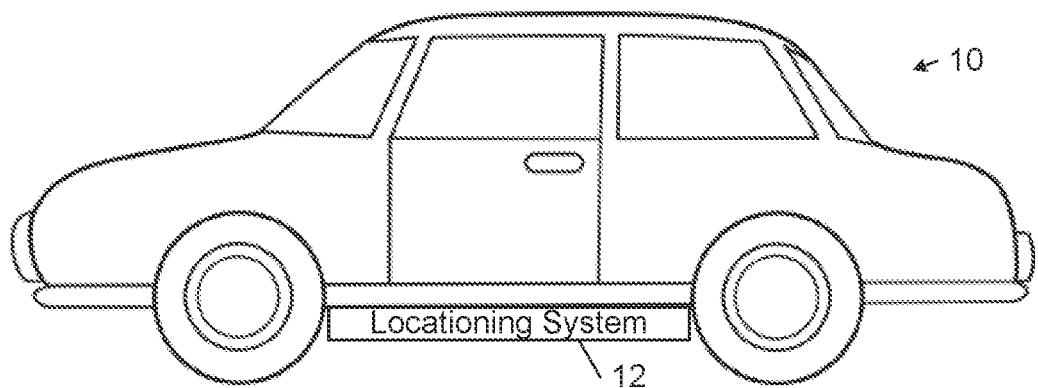
FIGS. 1A and 1B respectively show diagrammatic side and bottom views of an example vehicle that includes a locationing system on the vehicle chassis.
Figure 1B:
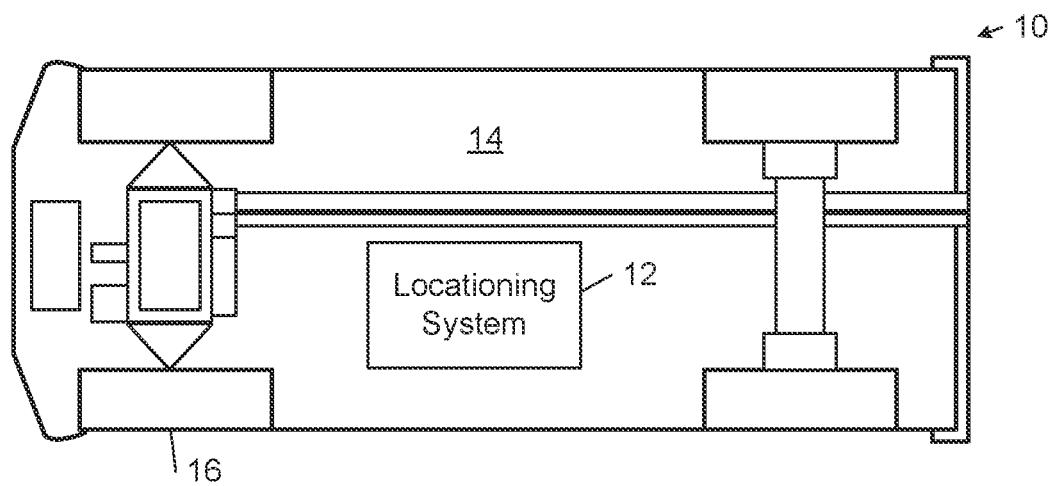

FIGS. 1A and 1B show an example of a vehicle 10 that includes an example locationing system 12 on the chassis 14 of the vehicle 10. The locationing system 12 may be integrated with the vehicle 10 during manufacture or it may be an add-on component that is retrofitted to the vehicle 10. In the illustrated example, the locationing system 12 may be located anywhere on the chassis 14 that provides a vantage point from which the locationing system 12 can capture images of the road surface. In some examples, the locationing system 12 is configured to simultaneously capture images of both the road surface and at least one wheel (e.g., wheel 16) so that wheel slippage can be optically detected and incorporated into the locationing process.

Figure 2:
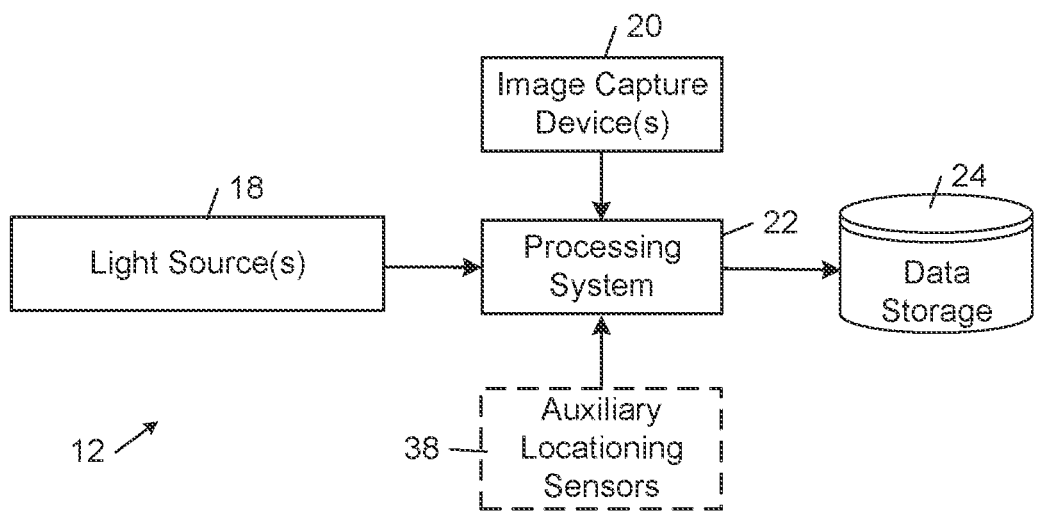
FIG. 2 shows a diagrammatic view of an example locationing system.

In the example shown in FIG. 2, the locationing system 12 includes at least one light source 18, at least one image capture device 20, a data processing system 22, and a data storage system 24. In some examples, the data processing system 22 is implemented by or integrated with the central control system of the vehicle. In other examples, the data processing system 22 is implemented, at least in part, by a remote data processing system or service that communicates with the locationing system 12.

Figure 3:
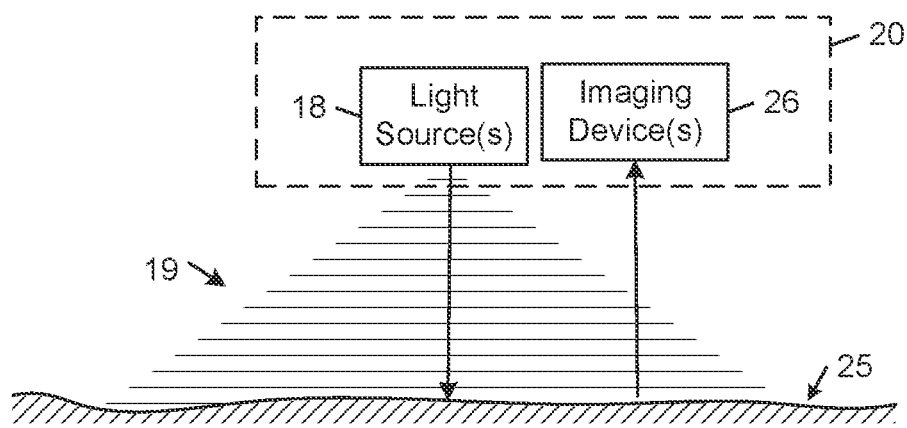
FIG. 3 is a diagrammatic view of one or more light sources illuminating a surface and one or more imaging devices capturing images of the illuminated surface.

Referring to FIG. 3, the light source 18 typically is a high brightness illumination source, such as a light emitting diode (LED) that emits light 19 of a particular wavelength towards a road surface 25. In some examples, the light source 18 emits light in the infrared wavelength range (e.g., 750-1400 nm). In other examples, different wavelengths of light may be used.

Figure 4:
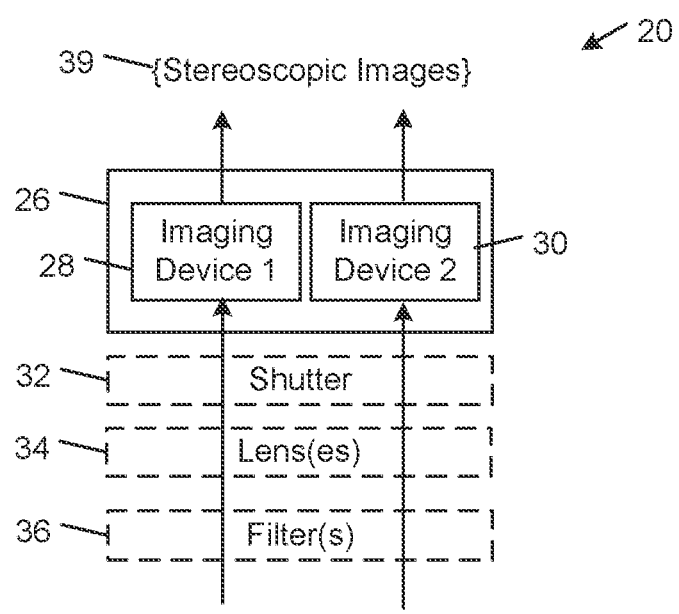
FIG. 4 shows components of an example of the locationing system shown in FIGS. 1A and 1B.

The image capture device 20 may include one or more imaging devices 26 that are capable of capturing images of a road surface at a high rate (e.g., 750-1000 frames per second). In some examples, the images are captured as grayscale images. In some examples (see FIG. 4), the image capture device 20 includes two stereoscopic imaging devices 28, 30 that are configured to capture a respective frame that includes at least two simultaneous stereoscopic images 39 for each image capture event. In some examples, a trigger signal or a global shutter 32 synchronizes the capture of the image frames by the imaging devices 28, 30. The image capture device 20 also may include one or more lenses 34 (e.g., fixed lenses or automatic zoom lenses), one or more optical filters 36 at least one of which may be matched to pass a wavelength of light generated by the light source 18, and an automatic exposure control system. The various components of the light source 18 and the image capture device 20 may be integrated and configured to optimize one or more parameters of the captured images (e.g., contrast).

The data processing system 22 processes the images captured by the image capture device 20 to determine an image-based trajectory of the vehicle along a road. In some examples, the image capture device 20 consists of a monocular camera with an optional ranging sensor that enables vehicle motion and depth to be calculated in terms of pixel motion across successive images. In preferred examples, however, the image capture device 20 includes two or more cameras that are fixed in position in a known geometry, which allows vehicle motion and depth to be calculated in real world dimensions (e.g., meters).

Figure 5:
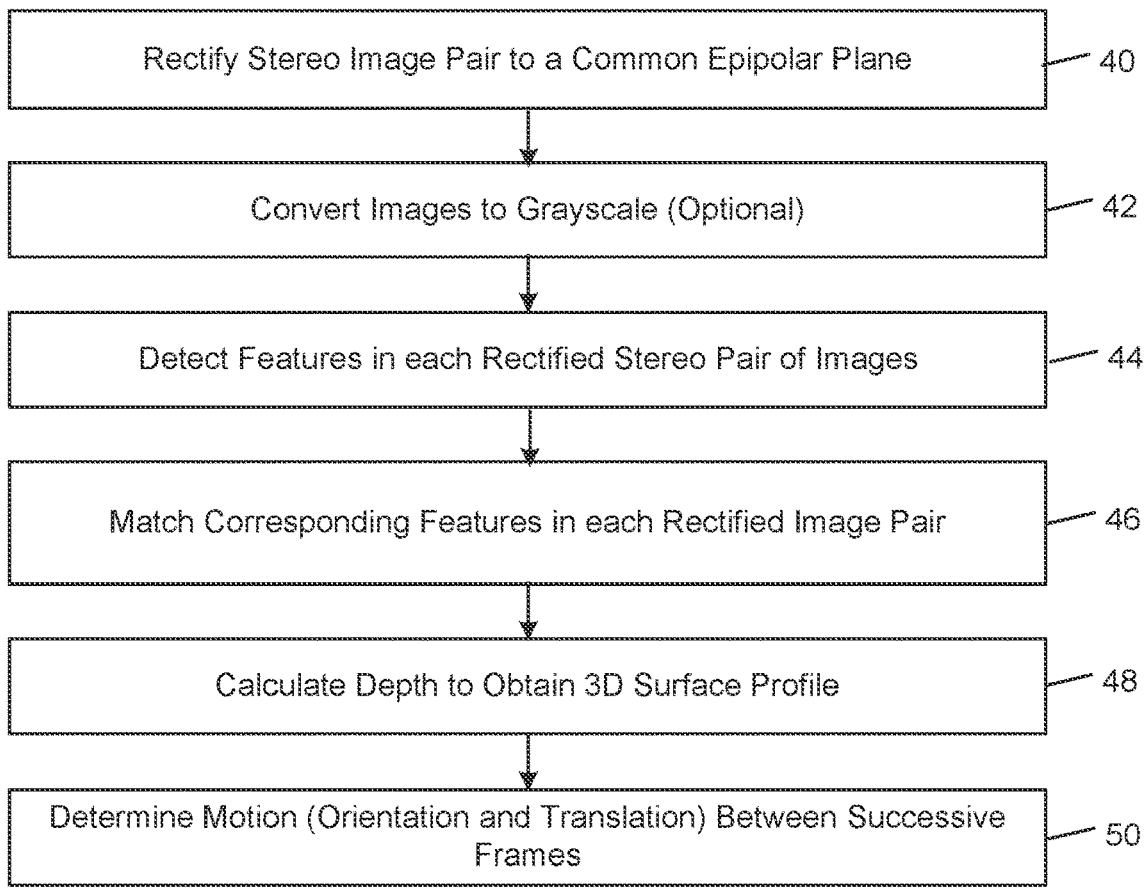
FIG. 5 is a flow diagram of an example image based locationing method.

Referring to FIG. 5, in one example, the data processing system 22 processes a sequence of frames of stereoscopic image pairs that are captured at different times (e.g., at equal time intervals) to determine respective estimates of three-dimensional points on the road surface.

The data processing system 22 rectifies each stereo image pair to a common epipolar plane (FIG. 5, block 40). The data processing system 22 may use any of a wide variety of methods to rectify the stereo image pair in each frame. Examples of such methods include planar rectification, cylindrical rectification, and polar rectification. In some examples, the resulting rectified images have epipolar lines that are parallel to the horizontal axis and corresponding points have identical vertical coordinates.

If the images of the stereo pair are not grayscale images, the images optionally may be converted to a grayscale format (FIG. 5, block 42).

The data processing system 22 detects features in each of the rectified stereo pair of images in each successive frame (FIG. 5, block 44). In general, features are points in an image that can be uniquely identified based on comparisons of colors, highlights, and other features in the pair of images. Examples include points that have high contrast with its neighbors in a local region of an image.

The data processing system 22 matches corresponding features in the rectified stereo pair of images (FIG. 5, block 46). In this process, the processing system 22 matches points (e.g., pixels) or features in one image of the stereo pair with corresponding interest points or features in the other image of the stereo pair. The result of this process is a feature disparity map, where the disparity is the pixel displacement between the matched features.

In some examples, the depth at each feature point is calculated to obtain a sparse three-dimensional surface profile (FIG. 5, block 48). In some examples, the data processing system 22 produces a depth map by calculating an elevation value for each feature in the disparity map using triangulation.

The data processing system 22 determines the motion of the vehicle (e.g., orientation and translation) between successive frames (FIG. 5, block 50). In some examples, an optical flow process is used to determine the motion and orientation of the vehicle between successive stereoscopic image frames.

In the examples described above, a stereoscopic image set in a frame is used to estimate the current trajectory of the vehicle. In order to obtain a denser and more robust dataset that is less sensitive to outliers, the imaged region of the road surface under the vehicle is divided into multiple tracks that can be processed to obtain multiple independent estimates of the vehicle's trajectory. Multiple of these estimates can be combined or otherwise used to determine estimates of the vehicle's motion and orientation between successive stereoscopic image frames. In some examples, the multiple independent sets of estimates can be used to identify and reject as outliers motion and orientation estimates that are inconsistent with the majority of other estimates.

Figure 6A:
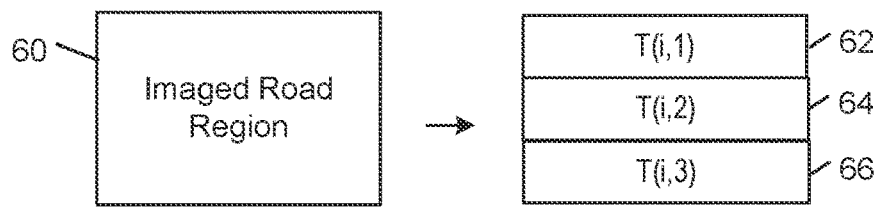
FIG. 6A is a diagrammatic view of an example of an imaged region divided into a set of parallel tracks.

Referring to FIG. 6A, in one example, an imaged road region 60 is divided into three parallel tracks 62, 64, 66, each of which is processed as an independent stereoscopic image frame. Each track 62, 64, 66 is processed independently of the other tracks 62, 64, 66 to obtain a respective set of interest points or features for the stereoscopic images in the frame for each track 62, 64, 66. From this information, the data processing system 22 can determine a respective set of disparity and depth maps for each track 62, 64, 66.

Figure 6B:
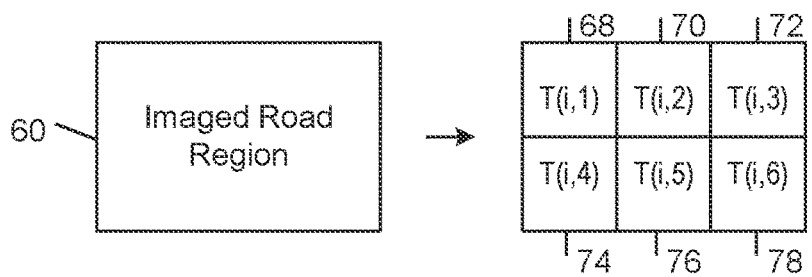
FIG. 6B is a diagrammatic view of an example of an imaged region divided into an array of tracks.

FIG. 6B shows another example, in which the imaged road region 60 is divided into a rectangular array of six tracks 68, 70, 72, 74, 76, 78, each of which can be processed to obtain respective independent sets of estimates of motion and orientation along the vehicle's trajectory.

In some examples, the imaged region 60 is divided into the tracks 62-66 and 68-78 by capturing a stereoscopic image set and windowing or bucketing the frame into regions that correspond to the sets of tracks 62-66 and 68-78. In other examples, the imaged region 60 is divided into the sets of tracks 62-66 and 68-78 using lenses or diffractive optical elements that are configured to direct the light reflecting from the road surface to respective ones of the sets of tracks 62-68 and 68-78. In still other examples the imaged region 60 is divided into the sets of tracks 62-66 and 68-78 using respective pairs of stereoscopic image devices 28, 30 (e.g., cameras) arrayed according to the desired track layout.

Figure 7:
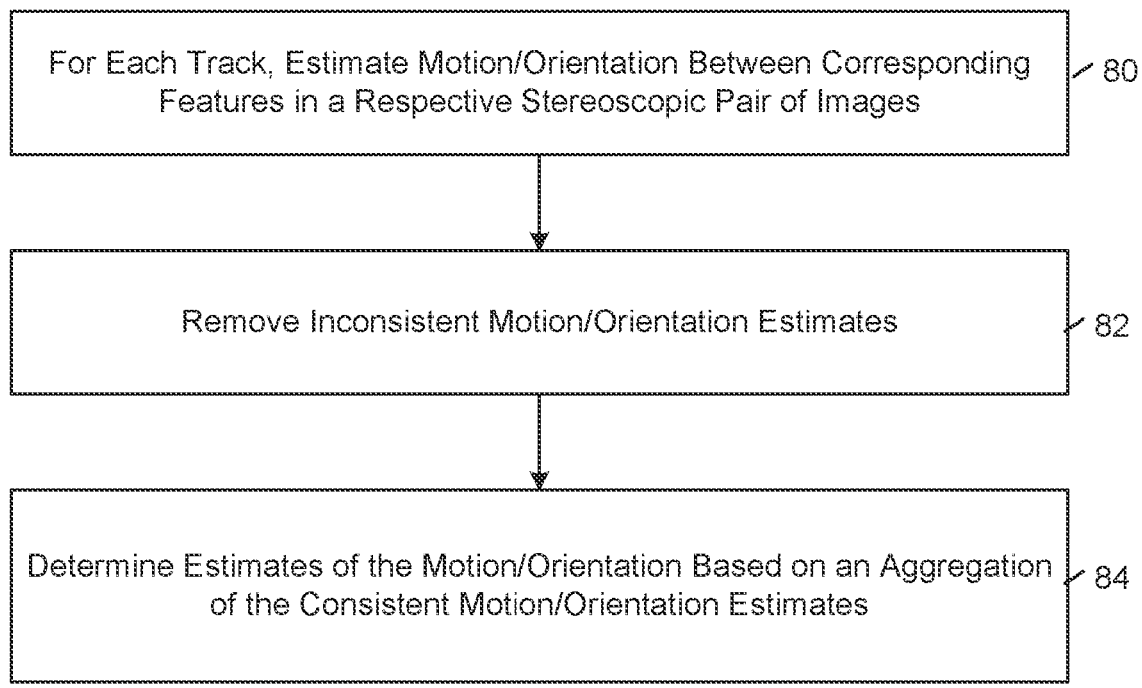
FIG. 7 is a flow diagram of an example process of estimating motion during a time step based on the positions determined for multiple tracks.

FIG. 7 shows an example method of determining estimates of the motion and orientation of a vehicle from successive stereoscopic image frames. In this example, for each track, the data processing system 22 estimates the motion and orientation between corresponding features in a respective stereoscopic pair images (FIG. 7, block 80). The data processing system 22 removes inconsistent motion and orientation estimates as outliers (FIG. 7, block 82). Estimates of the motion and orientation are determined based on an aggregation of the consistent motion and orientation estimates (FIG. 7, block 84). In some examples, the consistent motion and orientation estimates are averaged to determine the motion and orientation estimates.

Figure 8:
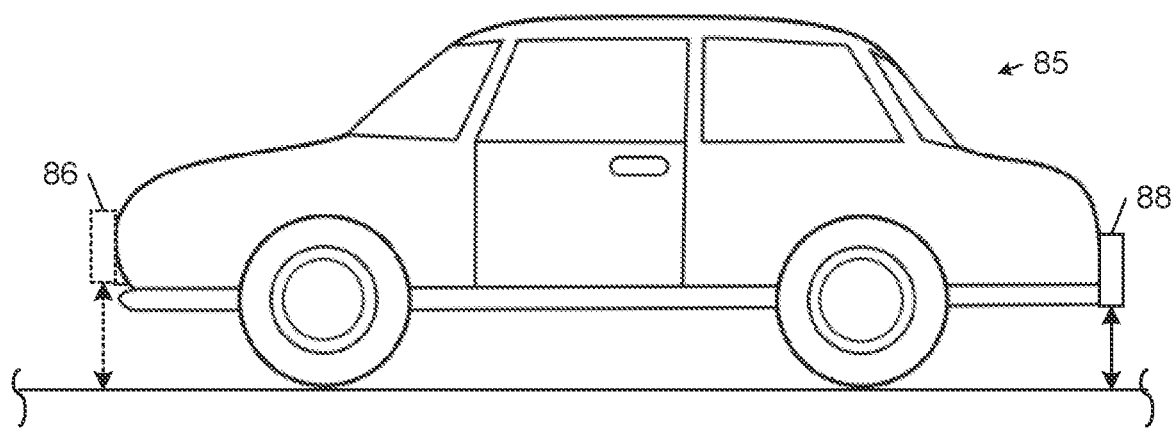
FIG. 8 shows one or more locationing systems located at different locations on an example vehicle.

FIG. 8 shows an example of a vehicle 85, in which one or more image-based locationing systems 86, 88 are mounted on the front and/or rear ends of the vehicle 10 and oriented to obtain images of the road surface.

Figure 9:
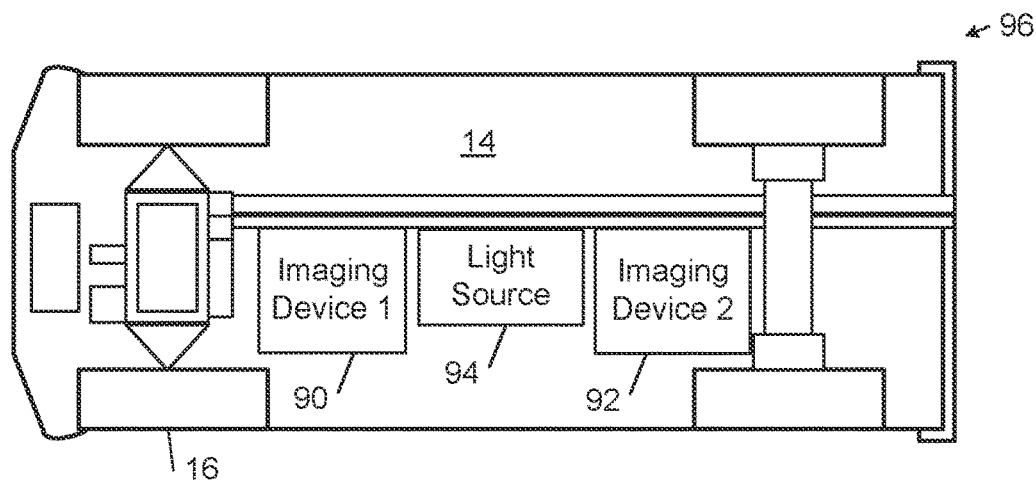
FIG. 9 shows an example vehicle that includes multiple locationing systems located on the vehicle chassis.

FIG. 9 shows an example of a vehicle 96 in which first and second imaging devices 90, 92 and a light source 94 are located on the chassis of the vehicle 96 at different locations along the longitudinal dimension of the vehicle 96. Each of the image capture devices 90, 92 is operable to obtain a series of successive stereoscopic image frames of the light reflecting from the road surface. The data processing system 22 is operable to determine the vehicle's direction of travel based on the locations of features detected in the images captured by the first imaging device 90 and the locations of matching features detected in the images captured by the second imaging device 92. By increasing the distance between the complementary images, this approach increases the accuracy of measured changes in direction. In another example, the first image capture device 90 is located under the vehicle 96 on the chassis and the second image capture device 92 is located on the roof of the vehicle 96.

Figure 10A:
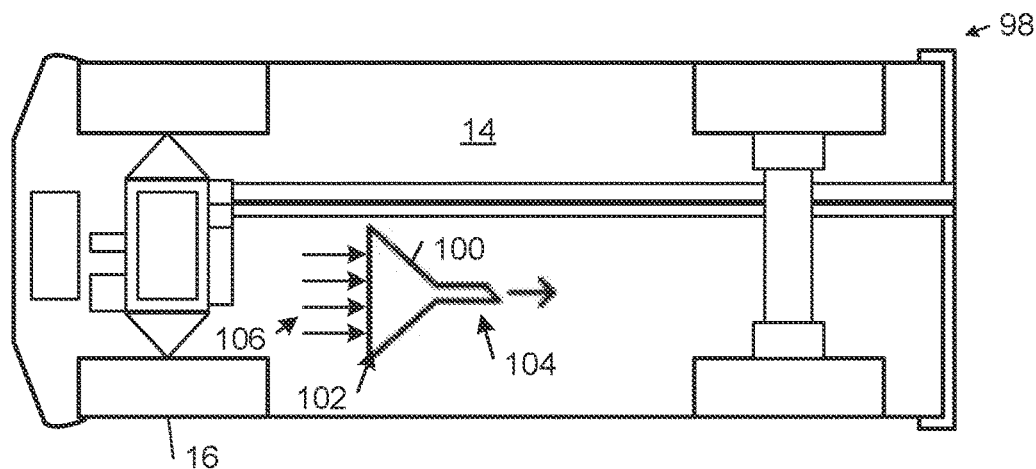
FIGS. 10A and 10B respectively show examples of different systems for maintaining the performance of the locationing system.

FIG. 10A shows an example of a vehicle 98 that includes a cleaning system 100 for the locationing system 12. In this example, the cleaning system 100 includes a funnel that includes a large input end 102 and a small output end 104. Movement of the vehicle 98 over the road causes air 106 to flow into the input end 102 of the funnel 100 at a first rate that depends at least in part on the speed of the vehicle 98. The optical cleaning system 100 is designed so that, under typical driving conditions, the input air is ejected from the output end 104 of the funnel 100 at pressure that is sufficient to remove dust and other debris from the optical and other components of the locationing system 12.

Figure 10B:
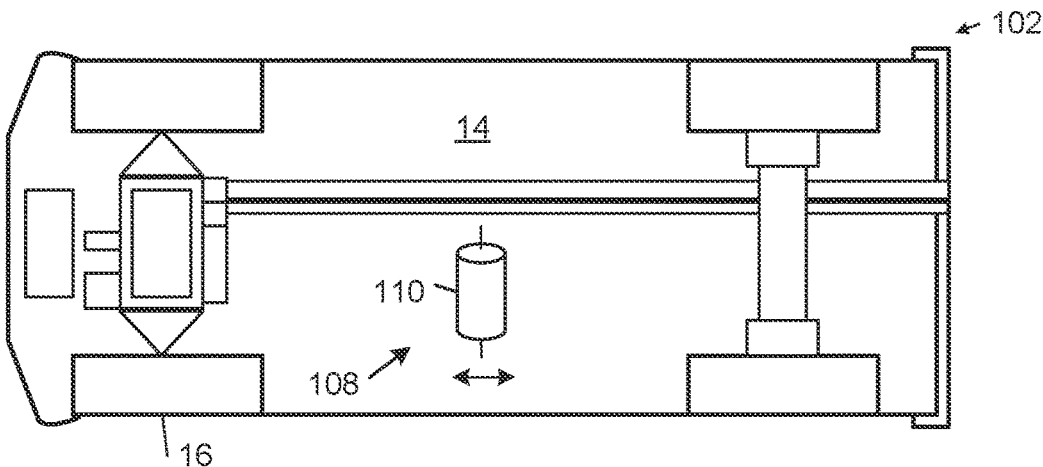

FIG. 10B shows an example of a vehicle that includes a cleaning system 108 for the locationing system 12. In this example, the cleaning system 108 includes an electrically powered cylindrical brush 110 that is configured to remove dust and other debris from the optical and other components of the locationing system 12. In some examples, the rotating brush is configured to move into and out of contact with the locationing system components either on a regular basis (e.g., each time the vehicle is turned on) or on demand (e.g., when a sensor detects that the optical and/or other components require cleaning).

Referring back to FIG. 2, in some examples, the data processing system 22 also integrates data received from one or more auxiliary locationing sensors 38 into the locationing process. Example auxiliary locationing sensors 38 include a wheel encoder, an inertial measurement unit (IMU), an inertial navigation system (INS), a global positioning system (GPS), a sound navigation and ranging (SONAR) system, a LIDAR system, and a radar system.

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

The invention claimed is:

1. A method comprising by a data processing system:
    obtaining a sequence of stereoscopic image frames each comprising a stereoscopic pair of images captured as a vehicle traverses a road;
    rectifying each stereoscopic pair of images to a common epipolar plane;
    detecting features in each of the rectified stereoscopic pair of images in each successive frame based on at least a comparison of colors or highlights within the rectified stereoscopic images;
    matching points of a detected feature in a first image each of the rectified stereoscopic pair of images with corresponding detected features in a second subsequent image of the respective rectified stereoscopic pair of images to generate a feature disparity map;
    calculating, using the feature disparity map, a depth at each matched points of the detected features to obtain a sparse three-dimensional depth map of the road;
    for each of the rectified stereoscopic pair of images, dividing an image region, above an imaged road region depicted in the rectified stereoscopic pair of images, into multiple tracks, and processing the multiple tracks to obtain multiple independent estimates of a trajectory of the vehicle based at least in part on the three-dimensional depth map and the matched points; and using the multiple independent estimates of the trajectory, determining motion and orientation of the vehicle between successive ones of the stereoscopic image frames.

2. The method of claim 1, comprising by the data processing system, converting each image of the rectified stereoscopic pair of images to a grayscale format.

3. The method of claim 1, wherein the disparity map measures pixel displacement between the matched features.

4. The method of claim 1, further comprising by the data processing system,
identifying and rejecting as outliers motion and orientation estimates that are inconsistent with a majority of other motion and orientation estimates.

5. The method of claim 1, further comprising by the data processing system, processing each of the tracks independently of other tracks to obtain a respective set of features for each track of the rectified stereoscopic pair of images.

6. The method of claim 5, further comprising by the data processing system, determining a respective set of disparity and depth maps for each track.

7. The method of claim 6, further comprising by the data processing system, dividing the imaged road region depicted in the rectified stereoscopic pair of images into a rectangular array of road tracks that is multiple road tracks wide and multiple road tracks long, and processing each road track in the rectangular array to obtain respective independent sets of estimates of motion and orientation along a trajectory of the vehicle.

8. The method of claim 7, wherein the dividing comprises dividing the imaged road region into the rectangular array of road tracks by windowing the imaged road region into the rectangular array.

9. The method of claim 7, wherein the dividing comprises dividing the imaged road region into the rectangular array of road tracks using optical elements configured to direct light reflecting from a surface of the road to respective ones of the road tracks in the rectangular array.

10. The method of claim 7, wherein the dividing comprises dividing the imaged road region into the rectangular array using respective pairs of stereoscopic image devices arrayed according to a track layout.

11. A method of processing a sequence of successive stereoscopic image frames to determine estimates of motion and orientation of a vehicle, the method comprising:
for each pair of stereoscopic images in each stereoscopic image frame, dividing an image region, above an imaged road region depicted in the pair of stereoscopic images, into multiple tracks;
for each track, by the data processing system:
detecting at least one feature in the pair of stereoscopic images based on at least a comparison of colors or highlights within the stereoscopic images, and estimating motion and orientation between subsequent pairs of stereoscopic images based on the at least one feature;
removing, by the data processing system, ones of the motion and orientation estimates that are inconsistent with others of the motion and orientation estimates, as outliers, with consistent motion and orientation estimates remaining;

determining, by the data processing system, estimates of motion and orientation of the vehicle based on an aggregation of the consistent motion and orientation estimates; and
processing the multiple tracks to obtain multiple independent estimates of a trajectory of the vehicle;
wherein the pair of stereoscopic images are captured as the vehicle traverses a road.

12. The method of claim 11, wherein the determining estimates of motion and orientation of the vehicle based on an aggregation includes averaging the consistent motion and orientation estimates to determine the motion and orientation estimates.

13. The method of claim 11, further comprising by the data processing system, processing each of the tracks independently of other tracks to obtain a respective set of features for each pair of stereoscopic images in the frame for each track.

14. The method of claim 13, further comprising by the data processing system, determining a respective set of feature disparity and depth maps for each track.

15. A computer program product for execution by a computer system and comprising at least one non-transitory computer-readable medium having computer readable program code portions embodied therein to process a sequence of images to determine an image-based trajectory of a vehicle along a road, the computer-readable program code portions comprising:
an executable code portion to obtain a sequence of stereoscopic image frames each comprising a stereoscopic pair of images captured as the vehicle traverses the road;
an executable code portion to rectify each stereoscopic pair of images to a common epipolar plane;
an executable code portion to detect features in each of the rectified stereoscopic pair of images in each successive frame based on at least a comparison of colors or highlights within the rectified stereoscopic images;
an executable code portion to match points of a detected feature in a first image of each of the rectified stereoscopic pair of images with corresponding detected features in a second image of the respective stereoscopic pair of images to generate a feature disparity map;
an executable code portion to calculate a depth at each matched points of the detected features to obtain a sparse three-dimensional depth map of the road;
an executable code portion to divide an image region, above an imaged road region depicted in the rectified stereoscopic pair of images into multiple tracks, and process the multiple tracks to obtain multiple independent estimates of the trajectory of the vehicle based at least in part on the three-dimensional depth map and the matched points; and
an executable code portion to, using the multiple independent estimates of the trajectory, determine motion and orientation of the vehicle between successive ones of the stereoscopic image frames.

16. The computer program product of claim 15, wherein the feature disparity map measures pixel displacement between the matched features.

* * * * *